United States Patent
Campbell et al.

(10) Patent No.: US 12,079,377 B2
(45) Date of Patent: Sep. 3, 2024

(54) X-RAY SENSITIVE MATERIALS FOR DATA PROTECTION

(71) Applicant: International Business Machines Corporation, Armonk, NY (US)

(72) Inventors: Eric J. Campbell, Rochester, MN (US); Matthew Doyle, Chatfield, MN (US); Mark J. Jeanson, Rochester, MN (US); Gerald Bartley, Rochester, MN (US); Darryl Becker, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 810 days.

(21) Appl. No.: 17/189,857

(22) Filed: Mar. 2, 2021

(65) Prior Publication Data

US 2022/0284131 A1 Sep. 8, 2022

(51) Int. Cl.
*G06F 21/72* (2013.01)
*C01G 5/02* (2006.01)
(Continued)

(52) U.S. Cl.
CPC ............ *G06F 21/72* (2013.01); *C01G 5/02* (2013.01); *C09D 7/61* (2018.01); *C09K 5/14* (2013.01);
(Continued)

(58) Field of Classification Search
USPC ........................................................ 324/600
See application file for complete search history.

(56) References Cited

U.S. PATENT DOCUMENTS

| 7,170,107 B2 | 1/2007 | Aumuller et al. |
| 7,498,644 B2 | 3/2009 | Shapiro et al. |

(Continued)

FOREIGN PATENT DOCUMENTS

| CN | 1474232 A | 2/2004 |
| CN | 107038386 A | 8/2017 |

(Continued)

OTHER PUBLICATIONS

Kreft et al., "Shell-in-Shell Microcapsules: A Novel Tool for Integrated, Spatially Confined Enzymatic Reactions," https://onlinelibrary.wiley.com/doi/epdf/10.1002/anie.200701173, Jul. 5, 2007, 4 pgs.

(Continued)

*Primary Examiner* — Farhana A Hoque
(74) *Attorney, Agent, or Firm* — Kelsey M. Skodje

(57) ABSTRACT

A method, printed circuit board assembly (PCBA), and device comprising a PCBA are disclosed. The method includes obtaining a material comprising silver halide grains, incorporating the material into a PCBA having at least one component in contact with the material, detecting a variation in electrical properties of the at least one component that is above a threshold variation and, in response, enacting a data protection response. The PCBA includes a material comprising silver halide grains, at least one component in contact with the material, and a monitoring component. The monitoring component is configured to detect a variation in electrical properties of the at least one component that is above a threshold variation and, in response, enact a data protection response.

20 Claims, 3 Drawing Sheets

(51) Int. Cl.
*C09D 7/61* (2018.01)
*C09K 5/14* (2006.01)
*G01J 1/42* (2006.01)
*G01R 31/00* (2006.01)
*G01R 31/28* (2006.01)
*G01T 1/17* (2006.01)
*H01L 23/00* (2006.01)
*H05K 1/02* (2006.01)
*H05K 1/18* (2006.01)

(52) U.S. Cl.
CPC ............ *G01J 1/429* (2013.01); *G01R 31/002* (2013.01); *G01T 1/17* (2013.01); *H01L 23/576* (2013.01); *H05K 1/0275* (2013.01); *H05K 1/181* (2013.01); *G01R 31/2801* (2013.01)

(56) References Cited

U.S. PATENT DOCUMENTS

| | | | |
|---|---|---|---|
| 8,343,437 B2 | 1/2013 | Patel | |
| 8,947,889 B2 | 2/2015 | Kelley et al. | |
| 2002/0199111 A1 | 12/2002 | Clark et al. | |
| 2004/0023164 A1 | 2/2004 | Bokhonov et al. | |
| 2008/0268385 A1* | 10/2008 | Miki ................... | G03C 7/3029 427/256 |
| 2009/0246358 A1 | 10/2009 | Winkel | |
| 2013/0034284 A1* | 2/2013 | Honkanen ............ | G06T 5/90 382/129 |
| 2013/0141137 A1 | 6/2013 | Krutzik et al. | |
| 2016/0322314 A1 | 11/2016 | Cao et al. | |
| 2017/0129825 A1 | 5/2017 | Campbell et al. | |
| 2017/0185805 A1* | 6/2017 | Breed ................... | G06F 21/78 |
| 2021/0057357 A1 | 2/2021 | Majerus et al. | |

FOREIGN PATENT DOCUMENTS

| | | |
|---|---|---|
| EP | 0224214 A2 | 6/1987 |
| EP | 0965902 A2 | 12/1999 |
| EP | 1700256 B1 | 8/2007 |
| EP | 2931011 A1 | 10/2015 |
| GB | 2505176 A | 2/2014 |

OTHER PUBLICATIONS

Tong et al., "Multilayer microcapsules with tailored structures for bio-related applications," https://www.researchgate.net/publication/248841192_Multilayer_microcapsules_with_tailored_structures_for_bio-related_applications, Aug. 2008, Journal of Materials Chemistry, 18(32), DOI: 10.1039/b805717, 14 pgs.

Wikipedia, "Silver halide—Wikipedia," https://en.wikipedia.org/wiki/Silver_halide#Light_sensitivity, printed Oct. 29, 2020, 2 pgs.

Xiong et al., "Towards Theranostic Multicompartment Microcapsules: in-situ Diagnostics and Laser-induced Treatment," https://www.thno.org/v03p0141.htm, Theranostics 2013; 3(3):141-151, doi:10.7150/thno.5846.

International Search Report and Written Opinion, International Application No. PCT/CN2022/077292, Apr. 14, 2022, 10 pgs.

* cited by examiner ated to a method. The
X-RAY SENSITIVE MATERIALS FOR DATA PROTECTION

BACKGROUND

The present disclosure relates to materials for cryptographic hardware protection and, more specifically, to materials containing silver halides for electromagnetic radiation detection.

Cryptographic computer hardware includes components for protecting the hardware from security threats. The components can include packaging materials designed to prevent tampering. Components that can detect security threats and enact protective actions can also be used. Security threats/tampering can include examination of cryptographic hardware via spectral imaging. This can allow viewing of internal hardware details in order to identify areas that can be probed or otherwise exploited to gain access to proprietary information.

SUMMARY

Various embodiments are directed to a method. The method includes obtaining a material comprising silver halide grains. For example, obtaining the material can include forming shells around droplets of the silver halide grains. The material is incorporated into a printed circuit board assembly (PCBA) having at least one component in contact with the material. For example, the material can be incorporated into an emulsification with a thermal interface material or a conformal coating. The method also includes detecting a variation in electrical properties of the at least one component that is above a threshold variation. In response to this detected variation, the method includes enacting a data protection response. In some embodiments, the method includes detecting a second variation in the electrical properties of the at least one component that is above a second threshold variation. The data protection response can include deleting data, destroying circuit paths, and/or generating an alert. In some embodiments, the data protection response includes mitigating damage caused by exposure to high energy radiation.

Additional embodiments are directed to a printed circuit board assembly (PCBA), which includes a material comprising silver halide grains, at least one component in contact with the material, and a monitoring component. The monitoring component is configured to detect a variation in electrical properties of the at least one component that is above a threshold variation and, in response, enact a data protection response. The material can also include a carrier medium, a colloidal material, a reducing agent, and/or a microcapsule. The silver halide grains can be embedded in the shell of the microcapsule and/or suspended in a colloidal material in the core of the microcapsule.

Further embodiments are directed to a device comprising a printed circuit board assembly (PCBA). The PCBA includes a material comprising silver halide grains, at least one component in contact with the material, and a monitoring component. The monitoring component is configured to detect a variation in electrical properties of the at least one component that is above a threshold variation and, in response, enact a data protection response. In some embodiments, the device includes a housing that is opaque to ultraviolet (UV) light. The device can also include a UV light sensor.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
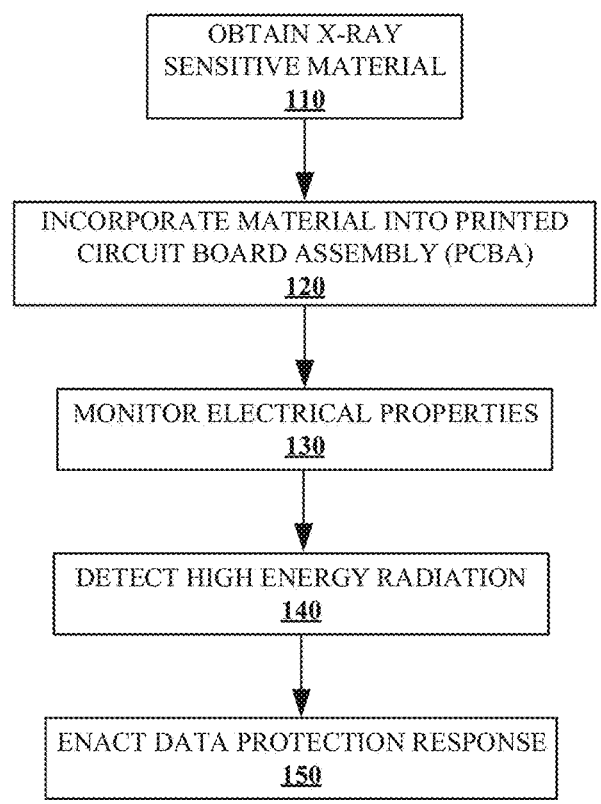
FIG. 1 is a flow diagram illustrating a data protection process, according to some embodiments of the present disclosure.

While the invention is amenable to various modifications and alternative forms, specifics thereof have been shown by way of example in the drawings, and will be described in detail. It should be understood, however, that the intention is not to limit the invention to the particular embodiments described. Instead, the intention is to cover all modifications, equivalents, and alternatives falling within the spirit and scope of the invention.

DETAILED DESCRIPTION

Cryptographic computer hardware includes components for protecting the hardware from security threats. The components can include packaging materials designed to prevent tampering. Components that can detect security threats and enact protective actions can also be used. Security threats/tampering can include examination of cryptographic hardware via spectral imaging. This can allow viewing of internal hardware details in order to identify areas that can be probed. In order to prevent this, packaging that is opaque to X-rays (~10 pm-10 nm) and other electromagnetic (EM) radiation used for spectral imaging techniques, such as infrared (IR) (~750-1 mm) and ultraviolet (UV) (~10 nm-380 nm) radiation, can be used. However, materials for this type of packaging (radiopaque materials) can be impractical and expensive. Further, radiopaque packaging does not have the ability to detect X-rays. Therefore, improved techniques for protecting hardware from X-ray imaging and damage caused by X-ray exposure are needed.

Disclosed herein are materials for X-ray detection and data protection. These X-ray sensitive materials include crystalline grains of silver halides (AgX, where X refers to chloride, bromide, and/or iodide). In some embodiments, the grains are encapsulated by microcapsules. Herein, "X-ray sensitive material" can refer to silver halide grains alone, suspended in a carrier medium, and/or in microcapsules, unless specified otherwise. The X-ray sensitive material can be incorporated into a device (e.g., a mobile computing device, a server, an external hard drive, etc.) in a variety of ways. For example, the X-ray sensitive material can be incorporated into an emulsion for a conformal coating or thermal interface material (TIM) on a printed circuit board assembly (PCBA). The X-ray sensitive material can also be incorporated into tapes or labels applied to the PCBA, dielectric layers in the PCB, chip encapsulant, underfill, corner bonding, etc. Exposure to X-rays or other EM radiation with sufficient energy can cause the silver halides to decompose, resulting in formation of elemental silver ($Ag^0$). Elemental silver is also referred to as silver metal herein.

Formation of silver metal causes changes in electrical properties of PCBA components in contact with the X-ray sensitive materials. Security measures may be enacted when the device detects X-ray exposure based on these electrical property changes. For example, the device can automatically delete data and/or destroy circuit paths in order to prevent unauthorized access to information. In some embodiments, the device can generate an alert (e.g., a message, sound, light indicator, etc.) indicating that X-rays have been detected. This can allow an authorized user to approve security measures such as data deletion and/or carry out other security actions (e.g., by remotely accessing the data). Additionally, in electronic devices containing components that can be damaged by high energy radiation (e.g., flash memory components), the X-ray sensitive materials can be used to determine that a device is in danger of being damaged. In response to this determination, mitigating actions can be taken to prevent further exposure to high energy radiation and/or to save data that may be lost if the device is damaged by electrical and/or chromatic changes.

FIG. 1 is a flow diagram illustrating a data security process 100, according to some embodiments of the present disclosure. An X-ray sensitive material is obtained. This is illustrated at operation 110. The X-ray sensitive material includes crystalline grains of silver halide (AgX, where X can be a chloride, bromide, or iodide anion). Various silver halide grains may be used, such as silver chloride, silver bromide, silver iodide, silver chlorobromide, silver chloroiodide, silver iodobromide, and/or silver chloroiodobromide. The halide composition of individual AgX grains can be homogenous or heterogenous. In some embodiments, the AgX grains have a mean size between 1 nm and 2 µm in diameter. For example, the mean size of the grains can be approximately 50 nm in diameter (e.g., ranging from about 49 nm-51 nm, 45 nm-55 nm, 40 nm-60 nm, etc.). However, AgX grains having other sizes can be used (e.g., about 1 nm-5 µm in diameter).

Figure 3:
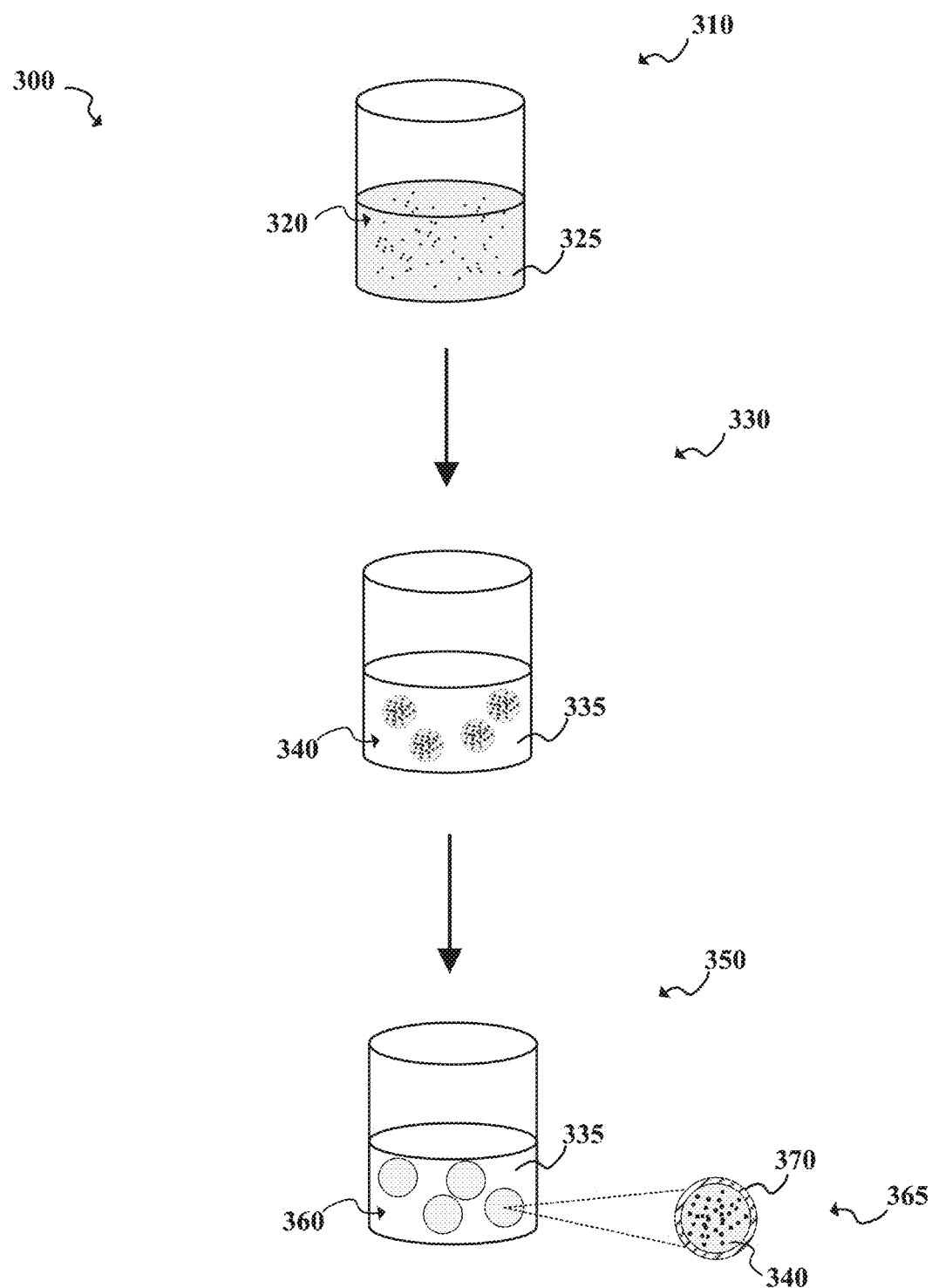
FIG. 3 is a schematic diagram illustrating a process of preparing an X-ray sensitive material, according to some embodiments of the present disclosure.

In some embodiments, the AgX grains are suspended in a carrier medium, such as gelatin or other colloidal material (see FIG. 3). The AgX grains can also be incorporated into the cores and/or shells of microcapsules in the X-ray sensitive material. A variety of techniques can be used to form shells around colloidally immobilized AgX grains. These can include techniques such as oil phase separation, aqueous phase separation, interfacial polymerization, molecular encapsulation, in situ polymerization, pressing, piercing, powder bed methods, spray drying, spray freezing, air suspension, vacuum evaporation deposition, complex coacervation, long and short centrifugation, etc. Examples of outer shell materials can include epoxy resins, polymethylmethacrylate or other acrylic resins, polyureas, polyurethane, urea-formaldehyde, polyamides, polyolefins, polystyrenes, polyethers, polyethylene glycol, alkyd resins, methyl cellulose, ethyl cellulose, carboxymethyl cellulose, hydroxyethyl cellulose, gelatin, gum arabic, shellac or other lac resins, mastic, sandarac, starches, dextrin, wax, rosin, sodium alginate, zein, etc. Additionally, AgX grains may be embedded in solid micro- or nanoparticles (e.g., silica particles) in other embodiments. Additives such as reducing agents, halide acceptors, visible and/or UV light absorbing compounds (e.g., carbon black). can also be included in the X-ray sensitive material.

The X-ray sensitive material is incorporated into an electronic device. This is illustrated at operation 120. For example, the X-ray sensitive material can be incorporated into printed circuit board assemblies (PCBAs) in devices such as servers, desktop or laptop computers, mobile computing devices, etc. The X-ray sensitive material can be deposited on the surface of or embedded within a device component and/or its housing. The device component containing the X-ray sensitive material can be positioned within a housing of the device. When the device housing is opaque to lower energy EM radiation, such as UV light, the formation of silver metal in the absence of X-rays can be prevented. In some embodiments, the X-ray sensitive material is part of a sensor assembly installed in or on a device by a user or device manufacturer. The X-ray sensitive material can also be integrated into a standard device component (e.g., components of any PCBA in the device) or within the printed circuit board itself. Examples of devices and PCBAs that can include the X-ray sensitive material are discussed in greater detail with respect to FIG. 2.

Fabrication of PCBAs having component(s) in contact with the X-ray sensitive material can be carried out using surface mount or through-hole techniques. Examples of microfabrication techniques that can be used can include casting, injection molding, embossing, ablation, compression molding, thin-film deposition, and/or Computer Numerical Control (CNC) micromachining. Additional examples of fabrication methods that can be used can include photolithography and/or etching (e.g., wet chemical etching, inductively coupled plasma deep silicon etching, laser ablation, air abrasion, reactive ion etching, etc.). PCBA components such as adhesives, TIMs, coatings, etc. can be applied by brush, spatula, liquid droplet dispenser, syringe, metering fluid dispenser, roller, tube with nozzle, etc. In some embodiments, fabrication steps can be carried out in a dark room in order to prevent premature silver formation caused by ambient light.

Electrical properties of the PCBA component(s) in contact with the X-ray sensitive material are measured. This is illustrated at operation 130. Any type of electrical properties can be measured, such as the electrical resistance (e.g., using a voltmeter, ammeter, ohmmeter, or combination thereof) and/or electrical capacitance (e.g., by determining the time it takes to charge the RC circuit) of the component. At least one initial electrical measurement can establish baseline properties to which subsequent measurements are compared. Electrical measurements can be added to a flash memory component on the PCBA and/or communicated to an external device (e.g., another computing device associated with the device owner). The electrical properties of the device component in contact with the X-ray sensitive material can then be monitored continuously or at preset intervals. In some embodiments, the device can also include a light sensor in order to account for the effects of ambient EM radiation (e.g., UV/visible light).

Based on detecting a change in electrical properties greater than a predefined threshold, high energy radiation can be inferred. This is illustrated at operation 140. Herein, high energy radiation refers X-rays or other frequencies above UV light. There can be a threshold variation in electrical properties indicating the formation of silver metal in the presence of X-rays. In some embodiments, there is more than one threshold. For example, there can be a threshold variation in electrical properties indicating an amount of silver metal formation consistent with direct exposure to X-rays. There can also be a threshold variation in electrical properties indicating that the device is exposed to less direct high energy radiation. For example, a device with components that can be damaged by X-rays or other high energy radiation may be in a room that contains an X-ray source, resulting in a smaller amount or more gradual formation of elemental silver. In other embodiments, there can be a single threshold. Threshold electrical property variations can be preset by a manufacturer and/or selected by a user.

When electrical property variations indicating silver metal formation have been detected, a data protection response is enacted. This is illustrated at operation 150. The data protection response can include automatically deleting or encrypting data (e.g., all data stored on the device or only data designated as sensitive or confidential). In some embodiments, the data protection response can include automatic and/or user-implemented actions such as destroying circuit paths in order to prevent unauthorized access to information, locking the device, generating an alert (e.g., a message, sound, light indicator, etc.) indicating that X-rays have been detected, mitigating damage caused by exposure to high energy radiation (e.g., by saving data, notifying a user, etc.), etc. The alert may be electronically transmitted to an administrator. In some embodiments, an alert is a notification message displayed on an electronic device having a display screen, such as a computer monitor, a mobile device screen, or any digital display. The alerts can be displayed as text, icons, images, colors, etc. However, alerts can also be lights (e.g., an LED panel) or sounds (e.g., a beep, ding, buzz, recorded voice, or computer-generated voice).

In response to a notification/alert, an authorized user can allow or deny enaction of a data protection response and/or carry out other security measures in some embodiments. For example, in instances where silver metal formation is detected in a device with components sensitive to high energy radiation, the device may generate an alert indicating that the device has been exposed to potentially damaging EM radiation. The alert can include other information, such as an indication that the device or the X-ray source should be relocated in order to avoid data loss or other damage to the device. The user may be required to provide authentication information in order to access the device/data. Authentication information can include one or more of a verified user ID, password, numerical code, biometric pattern (e.g., fingerprint, faceprint, voiceprint, retina scan, etc.), etc. In some embodiments, the authentication information is entered remotely via one or more computing devices. However, authentication information may be entered directly via the device in some embodiments.

Additional security measures that can be carried out by an authorized user can include deleting data, locking the device, notifying other users of the unauthorized access attempt, etc. In some embodiments, the user can also view information such as the electrical property measurements, estimated amount of elemental silver formation, automatic data protection response enacted, etc. The device may also include components such as a camera and/or location detection system. When X-rays are detected, the device can use components such as these to obtain and/or transmit additional information about the possible security threats or radiation damage (e.g., device location, identities of unauthorized parties, possible indirect sources of high energy radiation, etc.). This information can be provided to authorized users.

Figure 2:
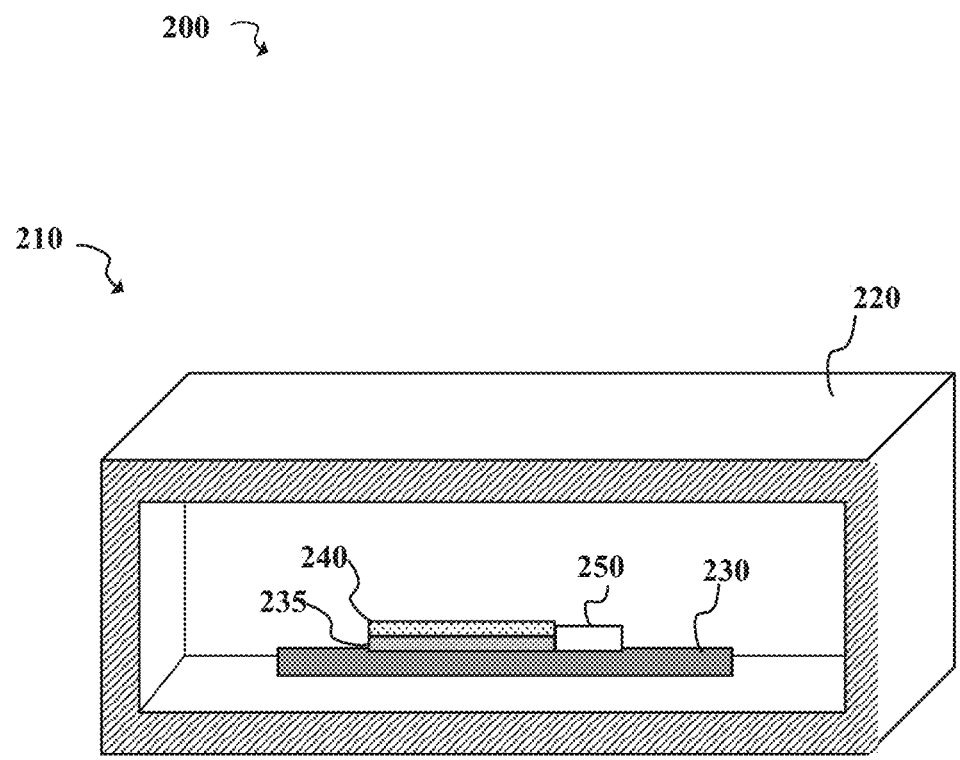
FIG. 2 is a block diagram illustrating a cross-sectional view of a device containing a material for sensing exposure to X-rays, according to some embodiments of the present disclosure.

FIG. 2 is a block diagram 200 illustrating a cross-sectional view of a device 210 containing a material for sensing exposure to X-rays, according to some embodiments of the present disclosure. To illustrate this example, but not to limit embodiments, FIG. 2 is described within the context of the data security process 100 illustrated in FIG. 1. Where elements shown in FIG. 2 are identical to elements shown in FIG. 1, the same reference numbers are used in each Figure.

The device 210 includes a housing 220 and a PCBA 230 having at least one component 235 in contact with an X-ray sensitive material 240, as well as a monitoring component 250. The shapes and sizes of the components of diagram 200 are for illustrative purposes, and it should be understood that the device 210, housing 220, PCBA 230, PCBA component 235, X-ray sensitive material 240, and monitoring component 250 can be any size or shape appropriate for their application. Further, the illustrated device components 220, 230, 235, 240, and 250 are not drawn to scale. The device 210 can also include various components that are not illustrated herein. Examples of PCBAs and components are discussed in greater detail with respect to FIG. 1.

The device 210 can be a computing device such as a server, desktop or laptop computer, mobile computing device, wearable electronic device, a cryptographic coprocessor card and/or card housing, etc. In some embodiments, the device 210 is part of a sensor assembly mounted in or on another device. The device 210 can also include additional PCBAs, a display screen, components for connecting to power supplies and/or external devices, etc. The device housing 220 can be made of various materials, such as steel, aluminum, and plastics (e.g., acrylic, acrylonitrile butadiene styrene, acetal, etc.). At least a portion of the housing 220 can be opaque to lower energy EM radiation, such as UV light. At least a portion of the housing 220 can also be opaque to visible light in some embodiments. The opacity to lower energy radiation can help prevent the formation of silver metal in the absence of X-rays by shielding the X-ray sensitive material 240 from ambient light.

The PCBA 230 is positioned within the housing 220, and can be any type of PCBA known in the art. For example, the PCBA 230 can be single-sided, double-sided, or multilayered. The PCBA 230 substrate can be made from any conventional PCB substrate materials (e.g., copper foil with a glass fiber-reinforced epoxy resin or a paper-reinforced phenolic resin). In some embodiments, electronic components are electrically and/or mechanically connected to the PCBA 230 using surface-mount technology. However, through-hole components and pluggable connectors (e.g., secure digital (SD) memory card connectors) can also be used.

For clarity, a single generic PCBA component 235 in contact with the X-ray sensitive material 240 is illustrated in FIG. 2. However, the PCBA 230 can include various components such as microprocessors, flash memory components, batteries and/or a connection to an external power supply, capacitors, resistors, inductors, memristors, semiconductors, diodes, transistors, integrated circuits, transducers, environmental sensors (e.g., light, oxygen, sulfur, humidity, shock, and/or vibration sensors), microcontrollers, coatings, adhesives, TIMs, encapsulants and other chip packaging materials, etc.

The X-ray sensitive material 240 can be in contact with at least one component 235 of the PCBA 230 (e.g., a component with measurable electrical properties that can be affected by silver metal formation). This is discussed in greater detail below. The X-ray sensitive material 240 includes crystalline grains of at least one silver halide, such as AgBr, AgCl, and/or AgI (generically referred to as AgX). The AgX grains can also include dopants such as silver sulfide (AgS) or gold incorporated into the AgX crystal lattice. These dopants or other crystalline defects (e.g., edge dislocation) act as sensitivity specks, which are electron traps required for silver formation.

The X-ray sensitive material 240 can include a carrier medium in which the AgX grains are suspended. Examples of carrier media can include a gelatin, oil, solid resin, solvent, etc. Carrier media are discussed in greater detail with respect to FIG. 3. Microcapsules can also be included in the X-ray sensitive material 240. In these instances, AgX grains can be in the microcapsule cores and/or shells. For example, the X-ray sensitive material 240 can include shells encapsulating droplets of a carrier medium with AgX grains. Microcapsules are illustrated in FIG. 3.

Additives such as reducing agents (e.g., hydroquinones) and/or UV/visible light-absorbing materials (e.g., carbon black) can also be incorporated into the X-ray sensitive material 240. For example, additives can be included in the AgX grain carrier medium. Additives can be incorporated into X-ray sensitive microcapsule cores and/or shells. Reducing agents can help promote silver formation upon exposure to high energy radiation, and light-absorbing materials can help prevent elemental silver formation in the absence of X-rays by absorbing the lower energy radiation.

The X-ray sensitive material 240 can be deposited on the surface of or embedded within component(s) 235 of the PCBA 230. In some embodiments, the X-ray sensitive material 240 can be incorporated by emulsification into conformal coatings (e.g., acrylic coatings, silicone coatings, epoxy coatings, urethane coatings, parylene coatings, nickel-filled and/or silver-coated epoxy or silicone coatings, thin film coatings, etc.), TIMs (e.g., a thermal film, thermal grease, thermally conductive pad, thermally conductive adhesive, polymer-solder hybrid, polymer-metal composite, hybrid resin, polyimide/silicone rubber laminate, etc.), adhesives such as corner/edge bonding materials (e.g., epoxy or acrylate adhesives), sealants, sealant/adhesives, electrical insulating gels, oils (e.g., polydimethylsiloxane (PDMS)), PCB dielectric layers, chip encapsulant or other packaging material (e.g., epoxies, polyimides, siloxane polyimide, silicones, polyxylylene, bis-benzocyclobutene, etc.), underfill (e.g., thermoset epoxies), etc.

The X-ray sensitive material 240 can also be added to tapes or labels applied to the PCBA 230. Additionally, the X-ray sensitive material 240 may be deposited on the surface of at least one PCBA component 235 via deposition techniques such as printing, spraying, brushing on, etc. In some embodiments, additives can be added to a PCBA component 235 with the X-ray sensitive material 240. For example, AgX grains and one or more additives can be incorporated into a conformal coating applied to the PCBA 230. This is not illustrated in FIG. 2.

Electrical properties of PCBA components 235 in contact with the X-ray sensitive material 240 are monitored by the monitoring component 250. For example, electrical properties of PCBA 230 components such as capacitors, wires, resistors, inductors, memristors, semiconductors, diodes, transistors, integrated circuits, transducers, etc. can be monitored. The monitoring component 250 can be a microcontroller mounted on the PCBA 230 that is configured to direct operations such as identifying data logging intervals, obtaining data (e.g., collecting and recording electrical measurements, making time interval measurements, etc.), carrying out data analysis, and communicating results of the data analysis. The monitoring component 250 can communicate the data to another device for analysis and/or display in some embodiments.

The monitoring component 250 can also communicate instructions for enacting data protection measures when there is a variation in electrical properties larger than a threshold variation. For example, the monitoring component can communicate instructions to delete or encrypt data, generate a warning (e.g., a light, sound, text or symbols on a display screen, etc.), send an alert message to an authorized user, etc. In some embodiments, the monitoring component 250 can communicate instructions to automatically destroy circuit paths via another PCBA 230 component (not shown) such as a temperature controller, heater, energy storage component, power supply, etc. Data protection measures that can be enacted are discussed in greater detail with respect to operation 150 of process 100 (FIG. 1).

FIG. 3 is a schematic diagram illustrating a process 300 of forming an X-ray sensitive material, according to some embodiments of the present disclosure. To illustrate this example, but not to limit embodiments, FIG. 3 is described within the context of the data security process 100 illustrated in FIG. 1 and the device 210 illustrated in FIG. 2. Where elements shown in FIG. 3 are identical to elements shown in FIGS. 1 and 2, the same reference numbers are used in each Figure.

In some embodiments, one or more operations in process 300 can be carried out at operation 110 of process 100. Operation 310 illustrates an example method for preparing AgX grains 320 suspended in a colloidal material 325. The AgX grains 320 can be formed by mixing solutions of a halogen salt and a silver salt using a single jet process, a double jet process, or a combination thereof. In some embodiments, the AgX grains 320 can be formed in the presence of excess silver ions (e.g., in a reverse mixing process) or while maintaining a constant pAg value (e.g., in a controlled double jet process). The rate of grain 320 growth can be adjusted by increasing or decreasing the concentrations or rates of addition of the soluble silver salt and halogen salt. In some embodiments, a cadmium salt, a zinc salt, a lead salt, a thallium salt, etc. can be added during grain ripening. When the AgX grains 320 have been prepared, soluble salts can be removed from the emulsion via washing and/or sedimentation methods.

The colloidal material 325 can be a hydrophilic colloid, such as gelatin. The gelatin can be alkali-processed, acid-processed, or enzyme-processed. Colloids formed from gelatin derivatives, gelatin grafted with other polymers, hydrolysis products of gelatin, or enzymatic decomposition products of gelatin can be used as well. Other proteins, such as albumin or casein, can be used in some embodiments. In other embodiments, the colloidal material 325 can be a cellulose derivative (e.g., hydroxyethyl cellulose, carboxymethyl cellulose, cellulose sulfate, etc.), a saccharide derivative (e.g., sodium alginate or a starch-based colloid), a synthetic polymer (e.g., polyvinyl alcohol, polyvinyl partial acetal, polyacrylic acid, polymethacrylic acid, polyacrylamide, poly-N-vinylpyrrolidone, polyvinyl imidazole, polyvinyl acrylamide, polyvinyl pyrazole, or copolymers thereof), etc.

Any appropriate technique for preparing AgX grains 320 in a colloidal material 325 can be used at operation 310. For example, an aqueous solution containing about 0.01 g/mL gelatin and about 0.01 g/mL potassium bromide (KBr) can be prepared. The solution can be kept at about 50° C. An aqueous solution of about 0.2 g/mL silver nitrate ($AgNO_3$) can be slowly added to the gelatin/KBr solution while stirring (e.g., over a period of approximately 10 minutes). An aqueous solution of about 0.03 g/mL potassium iodide (KI) can then be added to the mixture over a period of about 2 minutes, resulting in an emulsion of silver bromoiodide grains (AgX grains 320) in gelatin (colloidal material 325). Excess salts can be removed via sedimentation at an appropriate pH.

At step 330, the suspension of AgX grains 320 in the colloidal material 325 is added to an aqueous shell formation solution 335. For example, the aqueous shell formation solution 335 can include ethylene-maleic anhydride (EMA) copolymer (~2.5-5 wt % EMA), urea (~2.5 wt %), ammonium chloride (~0.25 wt %), and resorcinol (~0.25 wt %).

The pH of the solution 335 can be adjusted to about 3.5 (e.g., by addition of concentrated $HCl_{(aq)}$ and/or 10 wt % $NaOH_{(aq)}$. In some embodiments, approximately 1-2 drops of 1-octanol can be added to the shell formation solution 335 to eliminate surface bubbles. A slow stream of AgX grains 320 in gelatin 325 ("AgX/gelatin") can be added to the shell formation solution 335 (e.g., to a concentration of about 60 vol % AgX/gelatin) to form an emulsion containing droplets of AgX/gelatin 340 dispersed in the shell formation solution 335. The emulsion can be allowed to stabilize for approximately 10 minutes.

At step 350, a polymerizing agent is added to the shell formation solution 335, resulting in formation of X-ray sensitive microcapsules 360. For example, formalin (37 w/v % $H_2CO$ in water) can be added to the solution 335 to obtain an approximately 1:2 ratio of formaldehyde to urea. The mixture can then be heated to about 55-60° C. (e.g., at a rate of about 1° C./min), and allowed to react for about four hours under continuous agitation. In some embodiments, AgX grains 320 can be incorporated into the shell material by adding AgX grains 320 to the shell formation solution 335 without an immobilizing colloid. This is not illustrated herein. The polymerization reaction at operation 350 results in formation of the X-ray sensitive microcapsules 360. FIG. 3 illustrates a cross-sectional view 365 of one of the X-ray sensitive microcapsules 360. The cross-sectional view 365 shows a shell material 370 surrounding an encapsulated AgX/gelatin droplet 340.

During shell formation, the sizes of the AgX microcapsules can be controlled using a variety of well-known size control techniques. Examples of these techniques include adjusting reaction parameters such as pH, temperature, stir speed, reaction time, solvent(s), concentration of reactants, etc. In some embodiments, the microcapsules have size distributions within the micron range (e.g., about 1-10 μm, 10 μm-100 μm, 250 μm-500 μm, 100 μm-1000 μm). However, microcapsules of other sizes can be formed (e.g., about 10 nm-10 mm).

In addition to process 300, there are a variety of other microcapsule forming processes that can be used. These additional processes are not illustrated in FIG. 3. In one example of an alternative process, AgX grains are immobilized in colloidal particles via coprecipitation with a material such as calcium carbonate ($CaCO_3$), polystyrene, silica ($SiO_2$), melamine formaldehyde, etc. For example, AgX grains can be coprecipitated with $Na_2CO_3$ and $CaCl_2$) (e.g., in an aqueous solution of about 1 M $Na_2CO_3$ and about 1 M $CaCl_2$)) to form $CaCO_3$ colloidal particles. Layer-by-layer assembly of oppositely charged polyelectrolytes can then be used to form shells around the colloidal particles. For example, the colloidal particles can be dispersed in a 0.5 M NaCl solution of about 2 mg/mL poly(sodium 4-styrenesulfonate) (PSS), and shaken for about ten minutes. Excess PSS can be removed by centrifugation and washing with deionized (DI) water. The PSS-coated particles can then be re-dispersed in a 0.5 M NaCl solution of about 2 mg/mL poly(allylamine hydrochloride) (PAH), and shaken for about ten minutes. Excess PAH can be removed by centrifugation and washing with DI water. Additional bilayers can be added by repeating the PSS and PAH layering steps in some embodiments. In some embodiments, AgX grains can be incorporated into the shell material by adding AgX grains during the polyelectrolyte layering steps.

Multicompartment microcapsules can optionally be formed by immobilizing the resulting bilayer coated particles in colloidal particles via coprecipitation (e.g., with $CaCO_3$), and assembling an outer shell around the colloidal particles. The outer shell can be formed via various techniques known in the art (e.g., emulsion techniques such as those discussed above with respect to FIG. 3). The precipitated colloidal material can be extracted via complexation with ethylenediaminetetraacetic acid (EDTA). Other multicompartment microcapsules known in the art can be formed as well. For example, the light upconversion microcapsules can have at least two compartments in concentric, pericentric, innercentric, or acentric configurations in other embodiments.

Additional materials can be incorporated into the microcapsule cores and/or shells in some embodiments. For example, reducing agents can be added to an AgX/colloid suspension (e.g., at step 310 of process 300 (FIG. 3)). or shell formation solution (e.g., at step 330 or 350 of process 300) in order to promote silver metal formation. Without a reducing agent, exposure to X-rays may cause AgX grains having sensitivity specks to form silver metal on the surface only. With a reducing agent, these AgX grains can be completely converted to silver metal. Reducing agents that can be used can include hydroquinones, hydrazines, catechols, reductones, aminoreductones, p-aminophenols, p-phenylenediamines, 3-pyrazolidones, 3-aminopyrazoles, 4-amino-5-pyrazolones, 5-aminouracils, 4,5-dihydroxy-6-aminopyrimidines, o- or p-sulfonamidophenol s, o- or p-sulfonamidonaphthols, 2-sulfonamidoindanones, 4-sulfonamido-5-pyrazolones, 3-sulfonamidoindoles, sulfonamidopyrazolobenzimidazoles, sulfonamidopyrazolotriazoles, α-sulfonamidoketones, etc. Another example of an additive can be a UV/visible-light absorbing material, such as carbon black. This can reduce the exposure of AgX grains to these wavelengths, preventing formation of silver metal in the absence of higher energy radiation.

In some embodiments, compounds disclosed herein can have additional moieties such as epoxides, hydroxyl, propylene carbonate, alkyl halides, esters, alkynes, amines, isocyanates, acid chlorides, chloroformates, thiols, oxiranes, silyls, carboxylic acids, alkoxyls, alkyls, etc. Herein, "alkyl" refers to $C_1$-$C_{100}$ radicals, which can be linear, branched, or cyclic. Examples of alkyl groups can include methyl, ethyl, n-propyl, iso-propyl, n-butyl, iso-butyl, sec-butyl, tert-butyl, pentyl, hexyl, octyl, cyclopropyl, cyclobutyl, cyclopentyl, cyclohexyl, and cyclooctyl. In some embodiments, the alkyls are unsaturated (e.g., alkenes and alkynes).

The compounds described herein can contain one or more chiral centers. Unless otherwise noted, the disclosed structures cover all stereoisomers, conformers, rotamers, isomers, and enantiomers of the represented compounds. Further, polymers or other materials containing the disclosed compounds can include racemic forms of the compounds in addition to individual stereoisomers, as well as mixtures containing any of these. Substituents on the compounds described herein may participate in additional chemical reactions, transformations, or interactions, which can include synthesis, decomposition, single and/or double replacement, oxidation/reduction, acid/base, nucleophilic, electrophilic and radical substitutions, addition/elimination reactions, crosslinking reactions, and polymerization reactions.

Where isomers of a named alkyl, alkenyl, alkoxy, aryl, or other functional group exist (e.g., n-butyl, iso-butyl, sec-butyl, and tert-butyl), reference to a member of the group without specifying a particular isomer (e.g., butyl) is intended to include all isomers in the family (e.g., n-butyl, iso-butyl, sec-butyl, and tert-butyl). Further, unless specified otherwise, reference to one member of the group (e.g., n-butyl) includes the remaining isomers in the family (e.g., iso-butyl, sec-butyl, and tert-butyl).

Unless otherwise noted, chemical reactions are performed at ambient conditions or under slight heating with no special atmosphere or head space, and may be performed using standard organic solvents to manage mix properties such as viscosity and flow index. Standard procedures for quenching reactions, solvent removal, and purification are performed. Room temperature is between about 15° C. and 30° C. unless otherwise indicated. Ranges (e.g., time, concentration, temperature, etc.) indicated herein include both endpoints and all numbers between the endpoints. Unless specified otherwise, the use of "about," "approximately," or a tilde (~) in connection with a range applies to both ends of the range (e.g., "approximately 1 g-5 g" should be interpreted as "approximately 1 g-approximately 5 g"), and in connection with a list of ranges applies to each range in the list (e.g., "about 1 g-5 g, 5 g-10 g, etc." should be interpreted as "about 1 g-about 5 g, about 5 g-about 10 g, etc."). Unless otherwise indicated, modifying terms such as "about," "approximately," and "~" indicate +/−10% of a recited value, range of values, or endpoints of one or more ranges of values.

The processes discussed herein, and their accompanying drawings, are not to be construed as limiting. One skilled in the art would recognize that a variety of techniques may be used that vary in conditions, components, methods, etc., which ultimately result in silver halide-based X-ray detection materials. In addition, the conditions can optionally be changed over the course of a process. Further, in some embodiments processes can be added, omitted, or carried out in alternate orders, while still remaining within the scope of the disclosure, as will be understood by a person of ordinary skill in the art. It should also be noted that processes can be carried out by a single entity, or by multiple entities. For example, a first entity may prepare the X-ray sensitive materials, and a second entity may incorporate these materials into a device.

What is claimed is:

1. A method, comprising:
   obtaining a material comprising silver halide grains;
   incorporating the material into a printed circuit board assembly (PCBA), the PCBA comprising at least one component in contact with the material;
   detecting a variation in electrical properties of the at least one component that is above a threshold variation; and
   in response to the detecting the variation, enacting a data protection response.

2. The method of claim 1, wherein the enacting the data protection response comprises deleting data.

3. The method of claim 1, wherein the enacting the data protection response comprises destroying circuit paths.

4. The method of claim 1, wherein the enacting the data protection response comprises generating an alert.

5. The method of claim 1, wherein the enacting the data protection response comprises mitigating damage caused by exposure to high energy radiation.

6. The method of claim 1, further comprising detecting a second variation in the electrical properties of the at least one component that is above a second threshold variation.

7. The method of claim 1, wherein the incorporating the material comprises emulsifying the material in a thermal interface material.

8. The method of claim 1, wherein the incorporating the material comprises emulsifying the material in a conformal coating material.

9. The method of claim 1, wherein the obtaining the material comprises forming shells around droplets of the silver halide grains in a colloidal material.

10. A printed circuit board assembly (PCBA), comprising:
    a material comprising silver halide grains;
    at least one component in contact with the material; and
    a monitoring component configured to:
        detect a variation in electrical properties of the at least one component that is above a threshold variation; and
        in response to the detecting the variation, enact a data protection response.

11. The PCBA of claim 10, wherein the material further comprises a carrier medium.

12. The PCBA of claim 10, wherein the material is deposited on the surface of the at least one component.

13. The PCBA of claim 10, wherein the material further comprises a colloidal material.

14. The PCBA of claim 10, wherein the material further comprises a microcapsule containing the silver halide grains.

15. The PCBA of claim 14, wherein the silver halide grains are embedded in a shell of the microcapsule.

16. The PCBA of claim 14, wherein the silver halide grains are suspended in a colloidal material in a core of the microcapsule.

17. The PCBA of claim 10, wherein the material further comprises a reducing agent.

18. A device, comprising:
    a printed circuit board assembly (PCBA), comprising:
        a material comprising silver halide grains;
        at least one component in contact with the material; and
        a monitoring component configured to:
            detect a variation in electrical properties of the at least one component that is above a threshold variation; and
            in response to the detecting the variation, enact a data protection response.

19. The device of claim 18, further comprising a housing that is opaque to ultraviolet (UV) light.

20. The device of claim 18, further comprising a UV-light sensor.

* * * * *